March 8, 1932. C. M. COPELAND 1,848,870
WHEEL GUARD
Filed Oct. 6, 1930
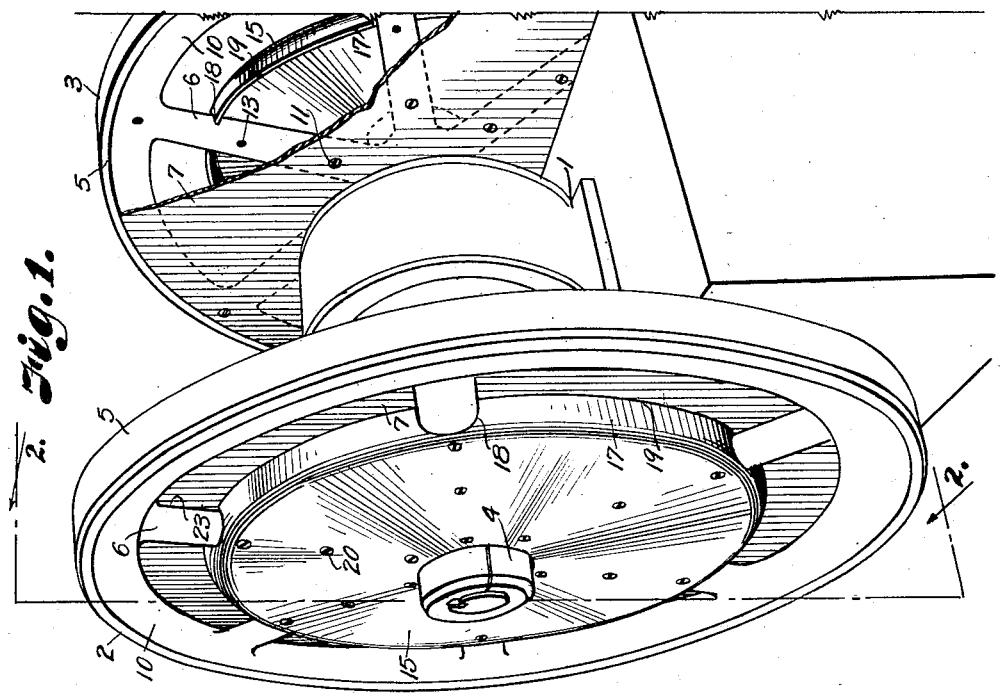
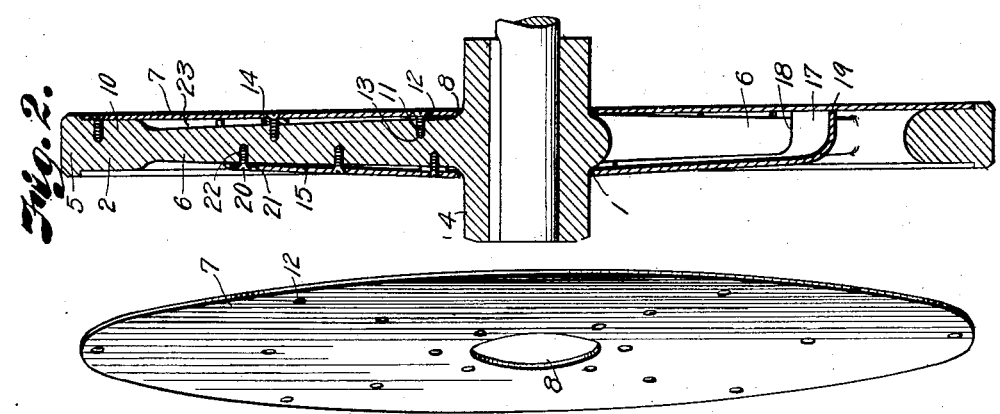
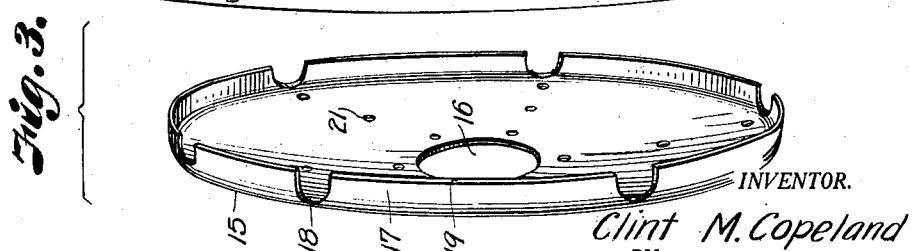
INVENTOR.
Clint M. Copeland
BY
Arthur C. Brown
ATTORNEY.

Patented Mar. 8, 1932

1,848,870

UNITED STATES PATENT OFFICE

CLINT M. COPELAND, OF MARLAND, OKLAHOMA, ASSIGNOR TO ACME FOUNDRY AND MACHINE COMPANY, OF BLACKWELL, OKLAHOMA, A CORPORATION OF OKLAHOMA

WHEEL GUARD

Application filed October 6, 1930. Serial No. 486,716.

My invention relates to wheel guards and particularly to safety guards for flywheels of internal combustion engines, steam engines, compressors and like machines, and has for its principal object to provide a simple form of guard which, when applied, becomes a permanent part of the flywheel, to protect persons employed about the engine from injury due to careless contact with revolving spokes of the wheel.

It is also an object of the invention to provide a guard which permits cranking of the engine by "rocking" the flywheel against compression and which prevents the hands or feet of the operator from slipping through the wheel incidental to the starting operation.

In accomplishing these and other objects of the invention, I have provided improved details of structure, the preferred form of which is illustrated in the accompanying drawings, wherein:

Fig. 1 is a perspective view of a conventional type of gas engine employing flywheels equipped with safety guards constructed in accordance with my invention.

Fig. 2 is a vertical sectional view through one of the flywheels on the line 2—2, Fig. 1, the section extending through a spoke at one side of the wheel and between a pair of spokes at the opposite side of the wheel.

Fig. 3 is a detail perspective view of a pair of guard elements disassociated from the wheel.

Referring more in detail to the drawings:
1 designates an internal combustion gas engine which may be of the two-cycle type and provided with flywheels 2 and 3 of conventional flywheel design including a hub 4 and a peripheral rim 5 connected to the hub by radial spokes 6.

Guards have been provided in the form of rails, netting and the like for enclosing the flywheels and are attached to the floor but when the engine is to be started the guards are in the way and must be removed until after the engine is started, since engines of the type illustrated are usually started by rocking the flywheel against compression, that is the operator grasps one of the upper spokes and turns the flywheel until the piston has passed dead center on the intake stroke. He then places his foot against one of the lower spokes and grasps an upper spoke, moving the wheel in reverse direction to compress the fuel charge and permit the compression to start rotation of the engine to trip the magneto for combusting the charge, continuing operation of the engine.

Therefore during the act of starting the engine the wheels are unguarded and it sometimes happens that the operator allow his hand to slip between the spokes of the flywheel, or the engine may accidentally backfire at the time he kicks the wheel over center, causing his foot to slip between the spokes and resulting in serious injury to the operator. As above mentioned it is an object of this invention to provide a guard which permits rocking of the flywheel as described but which prevents the operator from projecting his hands or feet through the wheel in starting the engine.

7 designates a sheet metal disk having an outer periphery for engaging against the inner diameter of the rim and having a concentric opening 8 for receiving the hub 4 of the wheel. The inner face of the disk bears against the depending web portion 10 of the rim, and against the base of the spokes 6, as best shown in Fig. 2.

The disk is fastened to the rim and spokes by screws 11 extending through countersunk openings 12 in the disk and into threaded openings 13 in the rim and spokes, respectively. Due to the draft of the spokes, washers 14 are preferably provided between the inner face of the disk and the spokes of the wheel to retain the disk in a true vertical plane with relation to the flywheel.

15 designates a complementary disk for enclosing the opposite face of the wheel and is provided with a central opening 16 for receiving the outer end of the hub 4 and a laterally and inwardly extending flange 17, having notches 18 to receive the spokes, for closing the space therebetween, as shown in Fig. 1. The disk 15 is preferably smaller in diameter than the inner diameter of the rim web to expose portions of the spokes 6 to provide hand holds for assisting in starting of the engine.

The notches 18 are preferably formed to closely fit against the spokes, and the edge 19 of the flange bears tightly against the inner face of the disk 7 so that a tight joint is provided around the spokes and between the respective disks. The flange 17 is preferably curved outwardly and inwardly from the outer plane of the disk 15 to provide a smooth curved surface to prevent injury to the operator. The disk 15 is preferably fixed to the spokes by screws 20 extending through countersunk openings 21 in the disk and into threaded openings 22 in the spokes similar to the other disk.

In applying the guard elements as an attachment to engines, the flywheels are removed from the engine and spokes are drilled and tapped to receive the screws 11 and 20. The inner disks 7 are slipped over the hubs and seated against the webs of the rims. The wheels are then replaced on the engine and secured in position. The outer disks 15 are then slipped over the hubs at the outer faces of the wheels so that the notches seat snugly around the spokes and the edges 19 of the flanges bear against the inner faces of the disks 17.

The screws 11 and 20 are then inserted to secure the disks to the wheels, so that the guards become a permanent part thereof and rotate therewith.

Owing to the taper or draft of the spokes a space 23 is provided between the spokes and the inner face of the disk 7 to receive the fingers of the operator when he grasps the spokes in starting the engine. It is apparent that only sufficient portions of the spokes are exposed to provide hand holds in starting the engine and that the plate 7 closes the arcuate openings through the wheels not covered by the disks 15 to prevent the operator's hands or feet from slipping between the spokes through the wheel.

What I claim and desire to secure by Letters Patent is:

1. A wheel guard including a disk for covering one side of a wheel and a cooperating disk covering the opposite side of the wheel and a peripheral flange extending between said disks and provided with notches for receiving spokes of the wheel formed on one of said disks.

2. In combination with a wheel having spokes, a wheel guard including a disk for covering the spokes at one side of the wheel and a complementary disk covering the spokes at the opposite side of the wheel, a peripheral flange provided with notches for receiving the spokes carried by one of said disks and forming a closure member for the space between said disks, and means for securing the disks to the wheel.

3. In combination with a wheel having spokes and a rim, a guard including a disk for covering a portion of the spokes at one side of the wheel, a laterally extending peripheral flange provided with notches for receiving the spokes integral with said disk, and a plate secured to the opposite side of the wheel and contacting said flange for covering the space formed between the flange of the first named disk and the rim of the wheel.

4. In combination with a wheel having spokes, a guard including a disk for covering the spokes at one side of the wheel, and a smaller complementary disk for covering portions of the spokes at the opposite side of the wheel, and a flange integral with said mentioned disk and cooperating with the larger disk for covering the space formed between the disks at the periphery of the smaller disk.

5. In combination with a wheel having spokes, a guard for the wheel including disks fixed to the sides of the wheel for covering the spokes, and a flange formed on one of the disks for exposing portions of the spokes and closing the space between the disks.

6. In combination with a wheel having a hub, a rim, and spokes connecting the hub and rim, a disk for covering portions of the spokes at one side of the wheel having an opening for receiving the hub of the wheel, a peripheral flange formed on said disk and provided with notches for receiving the spokes, and a plate on the opposite side of the wheel for covering the portions of the spokes not covered by the disk.

7. In combination with a wheel having spokes, a guard including a disk for covering the spokes at one side of the wheel, and a smaller complementary disk for covering portions of the spokes at the opposite side of the wheel, a peripheral flange cooperating with the disks for closing the space between the disks located at the periphery of the smaller disk, and means for spacing the disks from portions of the spokes.

8. In combination with a wheel having a hub, a rim, and spokes connecting the hub with the rim, a guard including a disk for covering a portion of the spokes at one side of the wheel, a laterally extending peripheral flange provided with notches for receiving the spokes carried by said disk, and a plate engaging the rim at the opposite side of the wheel for covering the space formed between the flange of the first named disk and the rim of the wheel.

In testimony whereof I affix my signature.

CLINT M. COPELAND.